United States Patent Office 2,764,466
Patented Sept. 25, 1956

2,764,466

PROCESS FOR DYEING A WOOL-ACRYLONITRILE FIBER MIXTURE

Lee Bidgood, Jr., Wilmington, Del., assignor to E. I. du Pont de Nemours and Company, Wilmington, Del., a corporation of Delaware No Drawing. Application August 28, 1952, Serial No. 306,935

10 Claims. (Cl. 8—21)

This invention describes a new process for dyeing fibers of acrylonitrile polymers. More particularly, it relates to dyeing blends of wool and acrylonitrile polymer fibers.

It is highly desirable to dye fabrics and similar objects containing wool and polyacrylonitrile to the same shade (union matching) or contrasting or similar, but not matching, shades. Also, it is frequently desirable to dye only the acrylonitrile polymers in the blends, leaving the wool in its natural color. Since wool is quite readily dyed, it has been hitherto impossible to dye mixtures of polyacrylonitriles and wool leaving the wool undyed. The acrylonitrile polymers have been dyed only to weak shades or the wool has been dyed with dyes that dye the polymer but are not normally preferred for dyeing the wool in the blend. Exact shade matching with a standard is a requirement of commercial dyeing.

It has been found that basic dyes have good affinity for acrylonitrile polymers. These dyes provide extreme brilliance, good to excellent wet fastness and better light fastness than that provided with the same dyes on mordanted cellulose. Since the number of dyes having affinity for acrylonitrile polymer is very small, it is desired to use these basic dyes. Unfortunately, these dyes, as a class, stain or dye wool when conventional techniques are used, and these dyes have notoriously poor fastness properties on wool. Hence, mixtures of polyacrylonitriles and wool dyed with basic dyes by conventional techniques are not commercially acceptable.

An object of this invention is to provide a process for preferentially applying basic color to the acrylonitrile polymer in the wool blends without staining the wool. Another object is the provision of a process for dyeing the components in the blends, simultaneously or separately, to the same or different shades. Other objects will appear hereinafter.

The objectives of this invention are reached by applying to acrylonitrile polymer/wool blends a basic dye, that is, any dye commercially termed a basic dye, in an aqueous dye bath containing about 2.5 to 15% by weight of an aliphatic organic acid and about 0.1 to about 2.0% by weight of an aliphatic non-ionic surfactant at about 160 to about 250° F., the weights being based on the weight of the blend. The surfactant used may have detergent or dispersing properties in addition to its general wetting or surface-active characteristics. It has been found, as described in the copending application of Hiller, Serial No. 306,936, that the basic dyes can be applied preferentially to polymers of acrylonitrile in blends containing other components, such as wool, cotton, polyamides and polyesters, if the dyeing is done at a pH of about 3.0 to about 5.0. Very good dyeing is obtained and the materials in the blend may be dyed, separately or simultaneously. Certain basic dyes, however, have such an affinity for wool that staining or dyeing of the wool occurs even within the pH range of 3 to 5. By the present invention any basic dye may be applied without troublesome staining of the wool, and all dyeings with basic dyes are considerably improved since scouring can be eliminated. Exact shade matching becomes possible.

The invention is further described below in examples given for illustrative, but not limitative, purposes. Percentages are by weight. The percentages of dyestuffs represent weight relationships of dyes to total fiber weights, and the dyes are in the usual commercial form. The yellow basic dye of Example I and several subsequent examples is identified at page 37–11 of the indicated B. I. O. S. report as "Astrazon Yellow 3G" with the following structural formula:

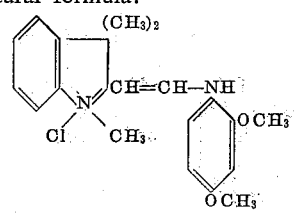

EXAMPLE I

A 50/50 wool/polyacrylonitrile fabric (staple blend; 5 g.) was dyed with a mixture of 0.76% yellow basic dye of BIOS Misc. Report #20 (PB 31004), 0.48% green basic color of C. I. 662, and 0.96% green acid color of C. I. 735, in a 200 ml. bath for 2 hours at the boil. The bath contained 0.5 g. of hydroxyacetic acid and 0.05 g. of a commercial non-ionic detergent, "Emulphor O," which is a long chain alcohol polyglycol ether prepared according to U. S. 1,970,578. A good union match was obtained. The bright green dyeing had fadeometer light fastness of 10–20 hours.

Omitting the hydroxacetic acid caused half or more of the basic color to dye the wool, with weakened shade on the polyacrylonitrile and very poor fastness of the dyeing to light and to rubbing.

The following aliphatic, non-ionic surfactants could be used in this and the following examples with comparable results: "Pluronic" F-68, a condensate (M. W. = 7500) of ethylene oxide with a propylene glycol/propylene oxide product; "Carbowax" 400, an ethylene oxide/ethylene glycol reaction product; and "Tween" 80, a polyoxyethylene derivative of sorbitan mono-oleate.

EXAMPLE II

Using the same procedure described in Example I, a 5 g. piece of 50/50 wool/polyacrylonitrile staple blend fabric was cross-dyed in contrasting colors. The following dyestuffs were used:

| | Percent |
|---|---|
| Yellow basic dye of Ex. I | 0.200 |
| Green basic dye of C. I. 662 | 0.072 |
| Red basic dye of C. I. 677 | 0.040 |
| Red acid dye of C. I. 31 | 1.000 |

By this procedure the polyacrylonitrile was dyed to a neutral gray shade and the wool was dyed to a red shade. Both shades were clear and bright indicating that no cross-staining had occurred in the dyeing.

EXAMPLE III

A 5 g. piece of 50/50 wool/polyacrylonitrile staple blend fabric was dyed in a 200 ml. bath as follows: the piece was started in the bath containing 2 or 3 drops of a solution of 0.5 g. of hydroxyacetic acid in 10 ml. of H₂O and 0.8% of the acid dye of C. I. 304. The dyeing was started at 100° F. and the temperature was raised to 200° F. over a period of 30 minutes. Two or three more drops of hydroxyacetic acid solution were added at 200° F. to exhaust the acid. The bath was then cooled to 170° F. The balance of the hydroxyacetic acid was added. Then 0.05 g. of the dispersing agent of Example I, 0.72% of the green basic dye of C. I. 662, 0.72% of the yellow basic dye of Example I, and 0.56% of the red basic dye of C. I. 677 were added. The dye bath was raised to the boil in fifteen minutes, and dyeing was continued at the boil for two hours. After rinsing and scouring for 30 minutes at 120° F. with 1% of the above dispersing agent (on weight of fiber) in the bath, the piece was ironed dry. A medium navy union shade was obtained. Repetition of this experiment with omission of the dispersing agent gave a considerably weaker dyeing of the polyacrylonitrile with the result that the shade could not be matched.

EXAMPLE IV

A 50/50 wool/polyacrylonitrile staple blend fabric (5 g.) was dyed as follows: the piece was entered into a 200 ml. bath containing 0.1 g. of acetic acid and 0.03 g. of the dispersing agent of Example I and 1.0% of the yellow basic dyestuff of Example I and 1.12% of the yellow acid dyestuff of C. I. 642. The temperature was raised slowly to the boil over a period of 20 minutes and dyeing was continued at the boil for two hours. After rinsing and scouring for 30 minutes at 120° F. in a scouring bath containing 1% of the dispersing agent of Example I (on weight of fiber), and then rinsing and drying, a bright yellow union was obtained. This dyeing had 20 to 40 hours fadeometer light fastness and showed only a trace staining in a standard AATCC alkaline perspiration test and withstood a 120° F. wool mill washing test for 30 minutes.

EXAMPLE V

A 5 g. 50/50 wool/polyacrylonitrile staple blend fabric piece was dyed as follows: the piece was entered into a 200 ml. bath at 160° F. containing 0.5 g. of $Na_2SO_4 \cdot 10H_2O$ 0.01 g. of acetic acid and 0.76% of the red acid dyestuff of C. I. 430. The temperature was raised to the boil over a period of 20 minutes, and dyeing was continued at the boil for 30 minutes with addition of 0.01 g. of acetic acid 15 minutes from the end of this time to promote exhaustion of the acid color on wool. The bath was then discarded. The piece was rinsed and entered in a fresh 200 ml. bath at 110° F. containing 0.15 g. of formic acid, 0.05 g. of the dispersing agent of Example I, 0.84% of the yellow basic dyestuff of Example I and 0.4% of the red basic dyestuff of C. I. 677. The temperature was raised to the boil in 20 minutes and dyeing was continued for two hours at the boil. The piece was then rinsed, scoured 30 minutes at 120° F. in a scouring bath containing 1% of the dispersing agent of Example I, rinsed and dried. A level bright carmine shade was obtained.

The above procedure was again followed exactly except that the acid color was omitted from the first bath. This gave a bright dyeing in which the polyacrylonitrile only was dyed. The wool remained white indicating that the basic colors had not stained the wool.

When the above procedure was repeated exactly except that the basic colors were omitted from the formula, the wool only was dyed and the polyacrylonitrile remained white.

These results proved that each color had dyed only the fiber for which it was intended.

EXAMPLE VI

A 75 g. 50/50 wool/polyacrylonitrile staple blend piece was dyed in rope form in a small scale laboratory beck. The piece was entered in a 3 liter dyebath at 110° F. containing 8.8 g. of hydroxyacetic acid (technical grade), 1.5 g. of the dispersing agent of Example I, 0.54 g. of the green basic dyestuff of C. I. 662 and 0.115 g. of the red basic dyestuff of C. I. 677. The beck was run and the temperature was raised slowly to the boil over a period of 30 minutes and dyeing was continued at the boil for 30 minutes. Then the bath was cooled (with the beck running) to 180° F. and 1 g. of $H_2SO_4$ was added and the beck was run for 5 minutes. Then 0.63 g. of the orange premetallized acid dyestuff of Prototype 146 was added, and the temperature was raised to the boil in 15 minutes. Dyeing was continued at the boil for 1.5 hours. The pH of the dye bath was 2.7 at the end of the dyeing. The fabric was rinsed, scoured 30 minutes at 55° C. in a 3 liter bath containing 1.5 g. of the above dispersing agent, rinsed and pressed dry. A cross-dyeing resulted in which the polyacrylonitrile was dyed a medium blue shade and the wool was dyed an orange shade. Clarity of the shades indicated that each dye had colored only the fiber for which it was intended. Repetition of this experiment using 9.8 g. of sulfuric acid instead of 8.8 g. hydroxyacetic acid and 1.0 g. sulfuric acid gave a weaker dyeing of polyacrylonitrile and a dull brown shade on the wool, indicating that the basic dyes had stained the wool.

EXAMPLE VII

A 5 g. piece of 50/50 wool/polyacrylonitrile was dyed as follows: a piece was started in a 200 ml. bath at 110° F. containing 0.5 g. of $Na_2SO_4 \cdot 10H_2O$, 0.05 g. of the dispersing agent of Example I, 0.02 g. of acetic acid and 0.032 g. of the blue acid dye-stuff of Prototype 223. The temperature was raised to the boil over a period of 20 minutes. Dyeing was continued at the boil for 35 minutes. Then 0.05 g. of acetic acid was added to exhaust the color and dyeing was continued for 25 minutes at the boil. The bath was then discarded and the piece was rinsed and entered into a fresh 200 ml. bath at 110° F. containing 0.5 g. of tartaric acid, 0.05 g. of the above dispersing agent, and 0.030 g. of the blue basic dyestuff of C. I. 663. The temperature was raised to the boil over a period of 20 minutes and dyeing was continued at the boil for two hours. After the usual rinsing, scouring and drying, brilliant greenish blue union was obtained.

EXAMPLE VIII

A 5 g. 50/50 wool/polyacrylonitrile piece was entered in a 200 ml. dyebath at 110° F. containing 0.5 g. $Na_2SO_4 \cdot 10H_2O$, 0.05 g. of acetic acid and 0.025 g. of the brown mordant acid dyestuff of Pr. 14. The temperature was raised to the boil over a period of 20 minutes and dyeing was continued at the boil for 40 minutes. Then 0.05 g. of acetic acid was added to exhaust the color and dyeing was continued at the boil for 20 minutes. The bath was cooled to 140° F. and 0.02 g. of sodium dichromate was added. The temperature was again raised to the boil over a period of 20 minutes and the chroming was continued at the boil for 0.5 hour. This bath was discarded. The piece was rinsed and then was entered in a fresh 200 ml. dyebath at 110° F. containing 0.05 g. of the dispersing agent of Example I, 0.75 g. of acetic acid, 0.05 g. of the yellow basic dyestuff of Example I, 0.004 g. of the red basic dyestuff of C. I. 677 and 0.004 g. of the green basic dyestuff of C. I. 662. The temperature was raised to the boil over a period of 20 minutes and dyeing was continued for a period of 2 hours at the boil. After the usual rinsing, scouring and drying, a brown union shade was obtained which was fast to 2 hours washing at 120° F.

EXAMPLE IX

A 50 g. 50/50 wool/polyacrylonitrile staple blend piece was dyed in a small scale laboratory beck as follows: the piece was entered in a 2 liter bath 110° F. containing 0.3 g. of the dispersing agent of Example I, 0.4 g. of hydroxyacetic acid and 0.44 g. of the acid dyestuff which is a 2:1 mixture of the blue acid dye of C. I. 1076 and the green acid dye of C. I. 737. The temperature was raised to 165° F. over a period of 20 minutes, then 0.22 g. of the green basic dyestuff of C. I. 662 and 0.19 g. of violet basic dye of C. I. 681 (dissolved in 1 ml. of acetone and 1 ml. of acetic acid) were added. The temperature was raised to the boil over a period of 30 minutes and dyeing was continued at the boil for 2 hours. After the usual rinsing, scouring and drying a medium blue union was obtained which had 10–20 hours fadeometer fastness.

EXAMPLE X

A 5 g. 50/50 wool/polyacrylonitrile piece was dyed according to the method described in Example VI. Only the dyestuff formulation was changed. The piece was started in 0.4% of the green basic dyestuff of C. I. 662 and 0.12% of the red basic dyestuff of C. I. 677. For the wool 0.88% of the blue premetallized acid dyestuff of Prototype No. 318 was used. After the usual rinsing, scouring and drying a medium blue union was obtained. This dyeing had 20–40 hours fadeometer fastness and excellent fastness to alkaline perspiration (standard AATCC test) and 120° washing.

This example was repeated with 10 lbs. of fabric in commercial equipment. Essentially the same results were obtained.

EXAMPLES XI–XVI

In each of the following examples (table) the indicated weights of wool and polyacrylonitrile fabrics were dyed together in a 200 ml. bath containing 0.5 g. hydroxyacetic acid and 0.05 g. of the dispersing agent of Example I and the indicated weights of dyestuff. The textile pieces were in each case placed in the bath at 110° F., and the temperature raised slowly to the boil and dyeing continued at the boil for two hours:

Table

| Example | Wool | g. polyacrylonitrile | Yellow basic dye of Ex. I, g. | Green basic color of C. I. 662, g. | Green acid color of C. I. 735, g. |
|---|---|---|---|---|---|
| XI | 2.0 | 3.0 | 0.0080 | 0.0014 | 0.0350 |
| XII | 3.0 | 2.0 | 0.0068 | 0.0076 | 0.0520 |
| XIII | 1.0 | 4.0 | 0.0122 | 0.0152 | 0.0174 |
| XIV | 4.0 | 1.0 | 0.0032 | 0.0038 | 0.0700 |
| XV | 0.5 | 4.5 | 0.0152 | 0.0172 | 0.0088 |
| XVI | 4.5 | 0.5 | 0.0016 | 0.0020 | 0.0798 |

After rinsing and scouring 15 min. at 110° F. in bath containing 1% dispersing agent of Example I (on fiber weight), rinsing and drying, it was noted that all of the above fabrics were dyed to essentially the same kelly green shade. This proved that results in this method are independent of percent of wool and polyacrylonitrile.

EXAMPLE XVII

A 2.5 g. piece of 50/50 wool/polyacrylonitrile (staple blend) was dyed with a mixture of 0.76% of the yellow dye of Example I, 0.48% of the green basic color of C. I. 662, and 0.96% of the green acid color of C. I. 735 in a 100 ml. bath containing 0.5 g. hydroxyacetic acid and 0.05 of the dispersing agent of Example I The cloth and dyebath were entered cold in a pressure vessel, the temperature was raised slowly to 250° F. in 20 minutes and held at 250° F. for 15 minutes. After rinsing and a 15 minute scour at 110° F. in 1% of the above dispersing agent, a bright kelly green union was obtained.

EXAMPLE XVIII

Using exactly the same dyebath formulation as in Example XVII, except that 0.60% of green acid color of C. I. 735 was used instead of 0.96%, a 2.5 g. piece of 50/50 wool/polyacrylonitrile (stock blend) was dyed 4 hours at 155–165° F. After rinsing and scouring 15 minutes at 110° F. in 1% the dispersing agent of Example I, a kelly green union was obtained only slightly weaker in shade than that of Examples I and XVII.

EXAMPLE XIX

A 2.5 g. piece of wool fabric and 2.5 g. of staple yarn composed of a copolymer of acrylonitrile and vinyl chloride (40:60) was dyed with a mixture of the basic yellow dye of Example I (0.76%), the green basic color of C. I. 662 (0.48%) and the green acid color of C. I. 735 (0.40%) in a 200 ml. aqueous bath for 2 hrs. at the boil. The bath also contained 0.5 g. of hydroxyacetic acid and 0.05 g. of the non-ionic detergent of Example I. A satisfactory shade match was obtained on the two types of fiber.

The fibers of acrylonitrile polymers used in this invention can be prepared in many ways, for example, as shown in U. S. Patent 2,436,926. The fibers may be in the form of continuous filaments, yarn, staple or fabric. The polymers include polyacrylonitrile (i. e., the homopolymer) and copolymers wherein the acrylonitrile component constitutes about 40% or more of the polymer molecule. These copolymers can be prepared in many ways using with acrylonitrile such copolymerizable monomers as vinyl chloride, methyl vinyl ketone, styrene, butadiene, vinyl pyridines, e. g., the 94/16 copolymer of acrylonitrile and 2-vinylpyridine, acrylic acid, methacrylic acid and the like. Of considerable commercial interest are the polymers containing at least 85% acrylonitrile and these can be dyed satisfactorily by the process of this invention, for these polymers have affinity for the basic dyes. The U. S. Patents No. 2,491,471 and 2,436,926 show a number of copolymers of acrylonitrile which may be used in the process of this invention.

The blends contain about 5 to 95% wool. The acrylonitrile polymer component and the wool may be blended in any way, and other materials, such as plasticizers and modifiers, may be present.

The aliphatic organic acids are used in amounts of about 2.5 to about 15% by weight of the material being dyed. In some cases as little as 2% or less of the acid is needed. The aliphatic acids may be any of the many water-soluble acids, such as acetic, propionic, citric, hydroxyacetic, formic, tartaric, maleic, fumaric, succinic, diglycollic or similar acids. The preferred acids are acetic, hydroxyacetic, tartaric and formic acids. The acid helps to keep the dye off the wool and contributes to the levelness and penetration of the dye on the acrylonitrile polymer. Mixtures of these acids can be used and, if desired, small amounts of mineral acids can be used with the organic acid. Amounts of aliphatic organic acid less than 2.5% are generally not preferred, because staining of the wool occurs. Amounts greater than 15% are generally avoided since at those levels the dyes are kept off both fibers.

The surfactants are non-ionic, long chain alcohol polyglycol ethers. They are prepared by the condensation of the alcohol with ethylene oxide or ethylene glycol. Any of the aliphatic surfactants shown in U. S. Patent No. 1,970,578 may be used in this invention. These surfactants are prepared by the reaction of ethylene oxide or ethylene glycol on the aliphatic alcohols given in the patent or such alcohols as sorbitol and mannitol. The surfactants are polyoxyalkylene derivatives of the alcohols. These surfactants can vary considerably in molecular weight depending upon the number of alkyleneoxy groups introduced. However, the surfactant must be non-ionic for ionic surfactants do not give the desired reservation. Further, they must be aliphatic, for non-ionic, aromatic surfactants are not operable in the process of this invention. The surfactants are used in the amounts of about 0.1 to about 2.0% by weight of the blend being dyed. Smaller amounts do not reserve the wool as well as desired and do not increase the depth of shade on the acrylonitrile polymer. Larger amounts retard the dyeing of the acrylonitrile polymer.

While dyeing is achieved at slightly elevated temperatures, it is preferred to heat the dye bath in order to get dying rates which are commercially feasible. Temperatures below about 160° F. are, therefore, not normally used and temperatures above 160° F. are applied. Temperatures above 250° F. can be used, those above 212° F. requiring pressure equipment. Such equipment is available in the dyeing industry and this invention does not require special equipment. The processes of this invention can be carried out conveniently in standard mill equipment and operations.

This invention provides commercially acceptable processes for dyeing mixtures of wood and polyacrylonitriles. In the presence of the non-ionic surfactants, the acids used do not retard the dyeing of the polyacrylonitriles, even in the high part of the acid concentration range. The basic colors are preferentially applied to the fibers of the crylonitrile polymer; the wool is not stained by any of the basic dyes. The dyer can readily obtain cross-dyed effects on wool/acrylonitrile unions. The amount of dye used may be varied to give tints or heavy shades as desired. Commercially acceptable union matching is obtained, for the dye used on the acrylonitrile polymer does not throw the final wool dyeing off shade. Polyacrylonitrile has been very difficult to dye and steps have been taken to modify the homopolymer to enhance its dyeability. Such modifications are unnecessary here, for the polyacrylonitrile can be dyed as it is obtained in its commercial form. The selective dyeing makes available dyed wool/acrylonitrile polymer blends for suiting material, other flat fabrics and the like.

Further, the dyeing process of this invention can be applied very successfully to the acrylonitrile polymers having high acrylonitrile content. Since these have been the most difficult to dye and since these polymers are of considerable commercial interest, the process of this invention facilities the marketing of shaped articles from these polymers. Also, essentially no staining occurs in the process of this invention and with the elimination of scouring superior shade matching is obtained and a more economical process is available to the trade.

I claim:

1. A process for selectively dyeing an acrylonitrile polymer in which the acrylonitrile component constitutes at least 40% of the polymer molecule in a mixture with wool which comprises treating the said mixture with an aqueous dye bath containing a basic dye, about 2.5% to about 15.0% of a water-soluble aliphatic carboxy acid and about 0.1% to about 2.0% of an aliphatic, non-ionic surfactant derived from ethylene oxide, said percentages being based on the weight of said mixture.

2. A process in accordance with claim 1 wherein said dye bath is heated to a temperature of about 160° F. to about 250° F.

3. A process in accordance with claim 1 wherein said mixture contains about 5% to about 95% wool.

4. A process in accordance with claim 1 wherein said surfactant is a polyoxyalkylene derivative of an alcohol.

5. A process in accordance with claim 1 wherein said acid is acetic acid.

6. A process in accordance with claim 1 wherein said acid is hydroxyacetic acid.

7. A process for dyeing a wool/acrylonitrile polymer mixture of fibrous material, said polymer including at least 40% acrylonitrile component in the polymer molecule, which comprises selectively dyeing said polymer by subjecting the said mixture to the action of an aqueous dye bath containing a basic dye, about 2.5% to about 15.0% of a water-soluble aliphatic carboxy acid, based on the weight of the said mixture, and about 0.1% to about 2.0%, based on the weight of the said mixture, of a non-ionic surfactant comprising a polyoxyalkylene derivative of a long-chain aliphatic alcohol; and dyeing said wool with an acid dye.

8. A process in accordance with claim 7 wherein said wool in said mixture is dyed prior to said polymer.

9. A process in accordance with claim 7 wherein said polymer in said mixture is dyed prior to said wool.

10. A process for dyeing selectively the components of a wool/acrylonitrile polymer mixture of fibrous material, said polymer including at least 40% acrylonitrile component in the polymer molecule, which comprises dyeing the wool with an acid dye and dyeing the said polymer with a basic dye by treating the said mixture with an aqueous dye bath containing compatible acid and basic dyes, about 2.5% to about 15.0% of a water-soluble aliphatic carboxy acid, and about 0.1% to about 2.0% of an aliphatic, alcohol polyglycol ether surfactant, said percentages being based on the weight of said mixture.

References Cited in the file of this patent

"Dyeing With Coal Tar Dyestuffs," by Whittaker and Wilcock, 5th ed., 1949, London; Balliere, Tindall and Cox publisher, p. 165.

Amer. Dyes, Reporter for December 12, 1949, pages P925–P928 incl.